UNITED STATES PATENT OFFICE.

JACOB MEYER, OF BERLIN, GERMANY.

PROCESS OF PREPARING SUBSTITUTES FOR SHELLAC.

No. 898,382.  Specification of Letters Patent.  Patented Sept. 8, 1908.

Application filed March 9, 1908. Serial No. 420,113.

*To all whom it may concern:*

Be it known that I, JACOB MEYER, chemist, a subject of the King of Prussia, German Emperor, and a resident of Berlin, Spichernstrasse No. 24, in the Kingdom of Prussia, Germany, have invented a Process for Preparing Substitutes for Shellac, of which the following is a full, clear, and exact specification.

My invention relates to a process for producing substitutes for shellac by treating a resin or resinous substances soluble in alcohol in the manner hereafter described. These resins could not heretofore be used for producing substitutes for shellac, though they have been comparatively cheap and readily obtainable in great quantities in the market. My invention differs therefore considerably and to its great advantage from other processes hitherto known. For instance, in the practice of one known process copal or another similar resin soluble in spirit of wine was dissolved together with oleic acid in alkali and then precipitated. This product was however of small practical use, chiefly because the oily and sticky oleic acid is not able to influence the luster and durability of a polish in a favorable direction. Besides the oleic acid has the inclination, to become saturated by absorbing the oxygen of the air, which gradually leads to its oxidation, especially in thin layers. For this reason the former product was of small practical use and its manufacture was discontinued. To make such polish durable, it was covered with a layer of collodion in order to prevent the action of the oxygen of the air. Even this modification did not make the preparation any better, because the layer of collodion was quickly worn off by use and the polish then deteriorated as before. I avoid all these disadvantages by my process and produce a really useful and lasting substitute for shellac. I attain this by dissolving a resin, soluble in alcohol, for instance copal, sandarac, accroides-resin in an aqueous solution of alkali. The solution of resinous soap thus formed is then decomposed and the resinous acids precipitated and then mixed with saturated fatty acids—for instance palmitic acid, stearic acid or a mixture of these acids, usually called stearic acid, viz: the stearin of trade. Another acid which may be used is cerotic acid. This mixture of resinous and saturated fatty acids possesses the remarkable quality of being a solid solution.

If an alcoholic solution of this mixture is spread on a surface and the solvent allowed to evaporate, an excellent polish remains uniformly covering the surface, which polish is just as durable as a polish of shellac in consequence of the substances originally used for the preparation being unchangeable by air. The mixture of the resinous and the solid saturated higher fatty acids I can prepare in various ways, for instance by mixing the solid substances or their alcoholic solutions for immediate use as polish or by dissolving both in aqueous alkali and then precipitating them.

The following is an example of my process: 60 parts by weight of manila copal or sandarac or accroides or a mixture thereof are dissolved in 27 parts by weight of a lye of potassium hydroxid (containing 33 parts KOH and 67 parts water) and 100 parts of water. This solution is then diluted with water and filtered, and then a hot solution of 2 parts of stearin of trade in 2 parts of caustic potash and 20 parts of water added. After precipitating with mineral acid for instance sulfuric acid the whole mass must be stirred for some time; then it is heated to about 70° C., filtered, washed and dried. The resins are precipitated from a cold solution and then heated in order to precipitate the resinous soap perfectly, which would not be the case, if they were precipitated from a hot solution. Besides the washing must be made after heating to be perfect. If said washing were done before heating an inferior product would be obtained. This preparation dissolves in alcohol as easily as shellac.

A further improvement of my process may be obtained by dissolving the resins soluble in alcohol not with caustic alkali but with carbonate of alkali. This modification has the great advantage of being cheaper than if caustic alkali be used, and besides the further advantage that the solid substitute is somewhat easier soluble in alcohol and in aqueous solution of borax, besides giving an exceptionally glossy polish, if solid saturated higher fatty acids are used. It is probable, that the better effect of this modification of my process finds its explanation in that the resinous acids treated with carbonates are less decomposed by saponification than if caustic alkali were used.

The following is an example of my modified process: 400 parts by weight of manila copal are dissolved in 1000 parts by weight of water and 60 parts of dehydrated carbonate of sodium by boiling it for several hours. The solution is then diluted by water, allowed to cool, filtered and then mixed with a hot solution of 8 parts by weight of stearin in 8 parts of hydroxid of potassium (containing 33 parts KOH and 67 parts water) and 80 parts of water. Finally the whole is neutralized with a mineral acid such as sulfuric acid, the precipitate filtered, washed and dried, as described in the first example.

I claim:

1. A process for preparing a substitute for shellac for polishing by dissolving 400 parts by weight of resin, soluble in alcohol, in 60 parts of dehydrated carbonate of sodium and 1000 parts of water, and then mixing said solution with a second hot solution of 8 parts by weight of stearin in 8 parts of hydroxid of potassium (containing 33 parts KOH and 67 parts of water) and 80 parts of water, whereupon the mixture of said solutions is neutralized with a mineral acid, the precipitate filtered, washed and dried.

2. A process for preparing a substitute for shellac for polishing by dissolving 400 parts by weight of resin, soluble in alcohol, in 60 parts of dehydrated carbonate of sodium and 1000 parts of water by boiling, said solution being allowed to cool, filtered and then mixed with a second hot solution of 8 parts by weight of stearin in 8 parts of hydroxid of potassium, (containing 33 parts of KOH and 67 parts of water), and 80 parts of water, whereupon the mixture of said solutions is neutralized with a mineral acid, the precipitate filtered, washed and dried.

3. A process for preparing a substitute for shellac for polishing which consists in dissolving 400 parts by weight of resins, soluble in alcohol, in 60 parts of dehydrated carbonate of sodium and 1000 parts of water by boiling, said solution being allowed to cool, filtered and then mixed with a second hot solution of 8 parts by weight of stearin in 8 parts of hydroxid of potassium, (containing 33 parts KOH and 67 parts of water) and 80 parts of water, whereupon mineral acid is added at a low temperature to the mixture of said solution, the whole mass then stirred for a longer period finally heated to about 70° C. and filtered, substantially as described and for the purpose set forth.

JACOB MEYER.

Witnesses:
HENRY HASPER,
WOLDEMAR HAUPT.